US006205980B1

(12) United States Patent
Spinnler

(10) Patent No.: US 6,205,980 B1
(45) Date of Patent: Mar. 27, 2001

(54) HIGH-PRESSURE DELIVERY PUMP

(75) Inventor: Fritz Spinnler, Mellingen (CH)

(73) Assignee: SIG Schweizerische Industrie-Gesellschaft, Neuhausen am Rheinfall (CH)

( * ) Notice: Subject to any disclaimer, the term of this patent is extended or adjusted under 35 U.S.C. 154(b) by 0 days.

(21) Appl. No.: 09/584,116

(22) Filed: May 31, 2000

(30) Foreign Application Priority Data

May 31, 1999 (CH) .................................................. 1013/99

(51) Int. Cl.[7] ................................ F02M 37/04; F16J 1/10
(52) U.S. Cl. ............................................... 123/495; 92/129
(58) Field of Search ............................ 123/495; 417/221, 417/470; 92/129

(56) References Cited

U.S. PATENT DOCUMENTS 2,213,994 * 9/1940 Rankin .................................. 92/129
4,548,124 * 10/1985 Ortelli .................................. 417/221
4,739,675 * 4/1988 Connell ................................. 92/129
5,947,069 * 9/1999 Koerner .............................. 123/90.6
6,000,368 * 12/1999 Mikame .............................. 123/90.6

* cited by examiner

*Primary Examiner*—Thomas N. Moulis
(74) *Attorney, Agent, or Firm*—Oblon, Spivak, McClelland, Maier & Neustadt, P.C.

(57) ABSTRACT

A high-pressure delivery pump is provided which includes a high-pressure cylinder and a plunger displaceable within the high-pressure cylinder. The high-pressure delivery pump also includes an eccentric pin which is arranged on a drive shaft having an axis of rotation perpendicular to a central longitudinal axis of the plunger. The plunger has a disk-shaped widened portion at a first end thereof. The disk-shaped widened portion extends radially outwardly from the high-pressure cylinder. A rolling ring in rotatably mounted on the drive shaft and an outer circumference of the rolling ring faces the widened portion of the plunger. The widened portion of the plunger bears against the outer circumference of the rolling ring to form a contact area. The rolling ring has at least one recess or relieved portion at its outer circumference.

11 Claims, 3 Drawing Sheets

HIGH-PRESSURE DELIVERY PUMP

BACKGROUND OF THE INVENTION

1. Field of the Invention

The present invention relates to a delivery pump for high pressure pumps and in particular, to the drive of delivery pumps which work according to the reciprocating-plunger principle.

2. Discussion of Background

High-pressure delivery pumps have a plunger stroke which is relatively long in relation to the plunger diameter and are therefore suitable for producing high pressures. Such high-pressure delivery pumps are used, for example, for producing the injection pressure in fuel injection systems (e.g., common rail) for internal combustion engines. A high-pressure delivery pump of the generic type is disclosed in EP-A-881 380 A1 (hereinafter "EP '380").

High-pressure delivery pumps of the generic type have a high-pressure cylinder or plunger cylinder and a cylindrical plunger movable therein in a reciprocating manner. The volume of the delivery space inside of the high-pressure cylinder is varied by the stroke movement of the plunger. During the filling stroke of the plunger, the delivery space can be connected to a supply space for a flow medium via a filling valve to fill the delivery space. The delivery space increases in swept volume with the flow medium. During a following delivery stroke with the filling valve closed, the pressure in the delivery space increases until a pressure valve opens and thereby connects the delivery space to a high-pressure space. The precise design of the high pressure pump is described in EP '380, the disclosure of which is hereby incorporated by reference so as to be expressly made the contents of the present application.

The plunger is driven by an eccentric drive. The eccentric drive includes an eccentric and said at least one relieved portion includes first and second relieved portions laterally defining said contact area, said first and second relieved portions each being provided at said outer circumference of said rolling ring. A disk-like widened portion is provided at a first end of the pre-loaded plunger. Because of the force ratios when passing through the top and bottom dead centers, the rolling ring rotates back and forth in the process and changes its direction of rotation twice during each revolution of the eccentric and eccentric shaft. This may lead to damage to the components of the eccentric drive at a high rotational speed of the eccentric shaft.

SUMMARY OF THE INVENTION

An object of the present invention is to provide a high-pressure delivery pump which works in a trouble-free manner at a high rotational speed. This object is achieved with a high-pressure delivery pump which includes a high pressure cylinder. A plunger is displaceable in the high-pressure cylinder. An eccentric pin is arranged on a drive shaft and a rolling ring is rotatably mounted on the eccentric pin. Either the plunger or a part connected to the plunger, such as a widened portion, bears against the rolling ring via a contact area. The rolling ring has at least one recess or relieved portion.

According to the present invention, the at least one recess or relieved portion of the rolling ring allows a reduction of the moment of inertia of the rolling ring with respect to its axis of rotation. Due to the reduction in the moment of inertia, the acceleration moment of the rolling ring, during a change in the direction of rotation, is also reduced. As a result of the reduction of the acceleration moment, damage to the eccentric drive is prevented, especially in the region of the contact area between the rolling ring and the plunger.

Thus, it is possible to operate a high-pressure delivery pump of the generic type at higher rotational speeds than they previously were operated at, without the adverse effect of a sliding movement between the rolling ring and the plunger base occurring. Furthermore, the reduction in the moment of inertia and thus, in the total mass of the rolling ring as a whole, relieves the load on the eccentric-drive construction, since the bearings of the drive shaft are also subjected to lower loads.

Advantageous embodiments of the present invention includes as follows:

A first embodiment, wherein the recess or relieved portion may be formed at the outer circumference of the rolling ring. As a result, the stability of the rolling ring is not reduced, although at the same time, the moment of inertia can be reduced.

In another embodiment of the present invention, the rolling ring has a least one encircling recess at its outer circumference and axially outside of the region of the contact area. In this embodiment, the rolling ring is sunk symmetrically outside of the region of the contact area. As a result of the rolling ring being outside the contact area, the stability again is not reduced, but the moment of inertia is reduced. Thus, the acceleration moment, during changes in the direction of rotation, is also not reduced.

It is especially advantageous if the rolling ring has two encircling recesses, which laterally define the contact area and which are each provided at the outer margin of the rolling ring. This creates a symmetrical arrangement, which is optimized with regard to the reduction in the moment of inertia. In this embodiment, the requisite outside diameter of the rolling ring is present only in the region of the contact area. The rolling ring is reduced in mass outside the contact area.

BRIEF DESCRIPTION OF THE DRAWING FIGURES

The present invention is explained in more detail below purely by way of example with reference to an advantageous embodiment and the attached figures. In the drawing.

DETAILED DESCRIPTION OF THE PREFERRED EMBODIMENTS

Figure 1:
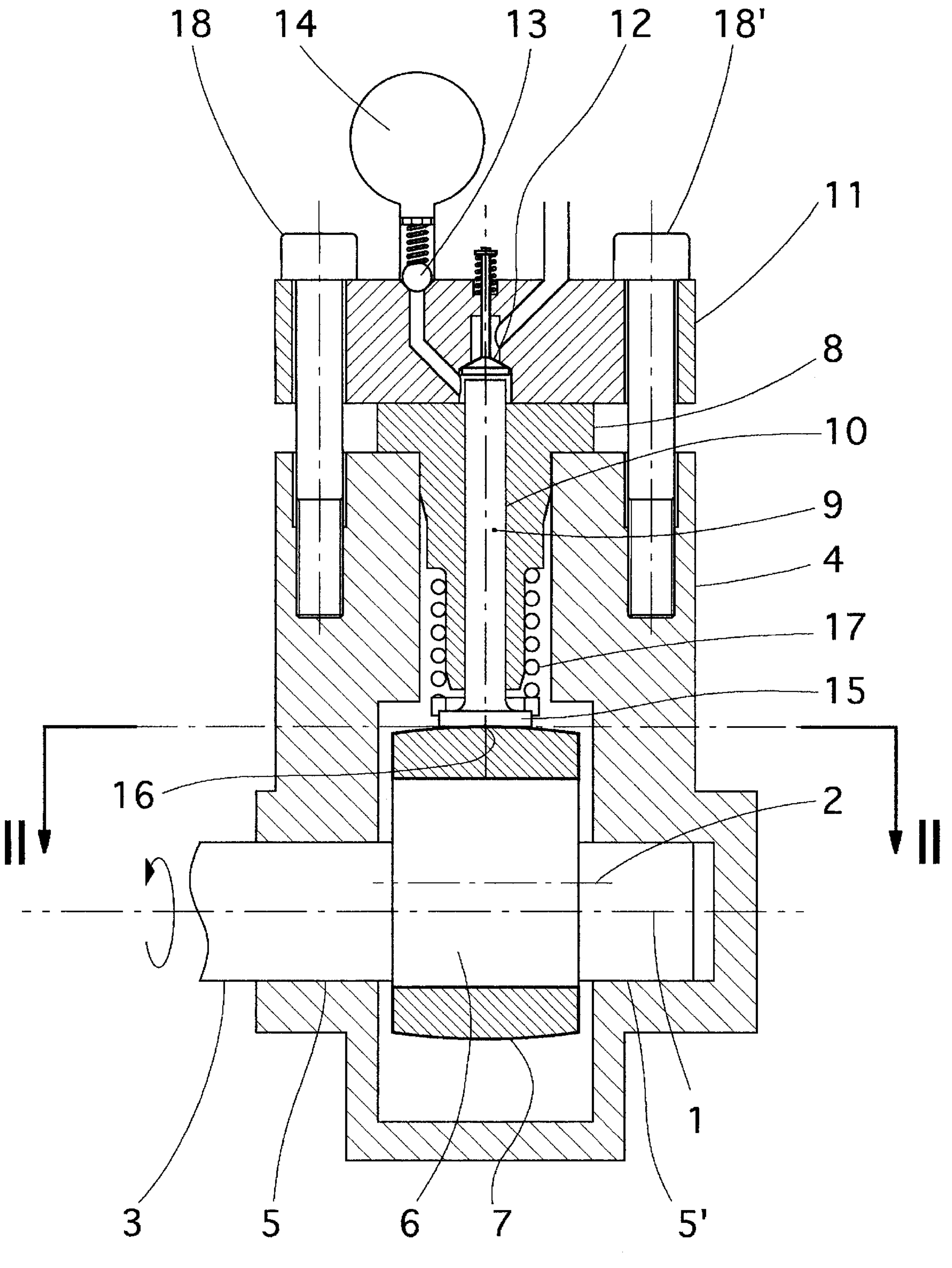
FIG. 1 is a cross-sectional view of a high-pressure delivery pump with an eccentric drive.

FIG. 1 is a longitudinal cross-section through a high-pressure delivery pump having a housing 4. A high-pressure cylinder 8 is mounted in the housing 4. A plunger 9 can move within the high-pressure cylinder in a reciprocating manner. The high-pressure cylinder 8 is clamped in the housing 4 by a base element 11. The base element 11 is screwed in the housing 4 via screw bolts 18, 18'. An inlet valve 12 and an outlet valve 13 are provided in the base element 11. The outlet valve 13 opens and closes a passage to a high-pressure receiver 14.

An eccentric drive is provided in the housing 4 of the high-pressure delivery pump. The eccentric drive has a drive shaft 3 which is supported via bearings 5, 5' so as to be freely rotatable about an axis of rotation 1. Between the bearings 5, 5', the drive shaft 3 carries an eccentric pin 6. The eccentric pin 6 is arranged eccentrically relative to the axis of rotation 1 of the drive shaft 3 and a central axis 2. The central axis 2 runs parallel to the axis of rotation 1 of the drive shaft 3. A rolling ring 7 is cambered on its outside circumference. The rolling ring 7 is mounted on the eccentric pin 6 so as to be rotatable relative to the eccentric pin 6.

The plunger 9 is guided so as to be displaceable in a sliding manner in an essentially circular-cylindrical bore 10 of the high-pressure cylinder 8. The plunger 9 has a disk-shaped widened portion 15 at a first end thereof which faces the drive shaft 3. The disk-shaped widened portion 15 sits on the rolling ring 7. A contact point or area 16 exists between the rolling ring 7 and the disk-shaped widened portion 15 at the first end of the plunger 9. The plunger 9 is pre-loaded against the rolling ring 7 via a compression spring 17. The compression spring 17 is supported on a first side on the high-pressure cylinder 8 and on a second side on the disk-shaped widened portion 15 of the plunger 9.

To compress and deliver a flow medium, the plunger 9 is moved up and down by the eccentric drive, including the drive shaft 3, the eccentric pin 6, and the rolling ring 7. When the plunger 9 moves downwardly during a filling stroke, a delivery space of the high-pressure cylinder 8 is filled with the flow medium via the inlet valve 12. When the plunger 9 moves upwardly during a subsequent delivery stroke, the inlet valve 12 is closed and the pressure in the delivery space increases until the outlet valve 13 opens. When the outlet valve 13 opens, the delivery space is connected with the high-pressure receiver 14. In the process, the flow medium is delivered into the high-pressure receiver 14.

Figure 2:
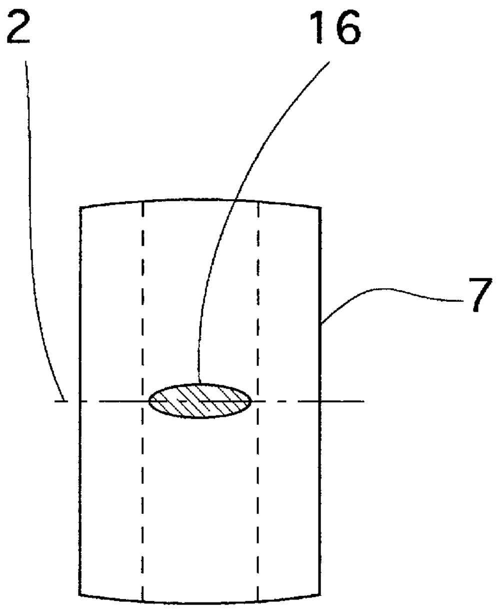
FIG. 2 is a cross-sectional view taken along the plane II—II shown in FIG. 1, which represents the contact area between the rolling ring and the plunger.

FIG. 2 is a cross-section taken along line II—II of FIG. 1 to show the contact area 16. The contact area 16 occurs during high-pressure loads of the plunger 9 against the rolling ring 7. Therefore, the contact area 16 is elliptical due to the rolling ring 7 being slightly cambered.

Figure 3:
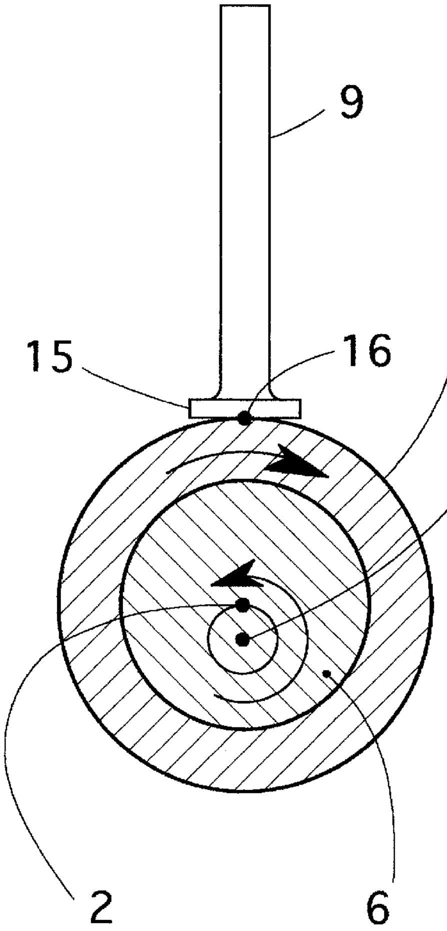
FIG. 3 is a cross-sectional view of an eccentric drive in the top dead center position of the plunger.
Figure 4:
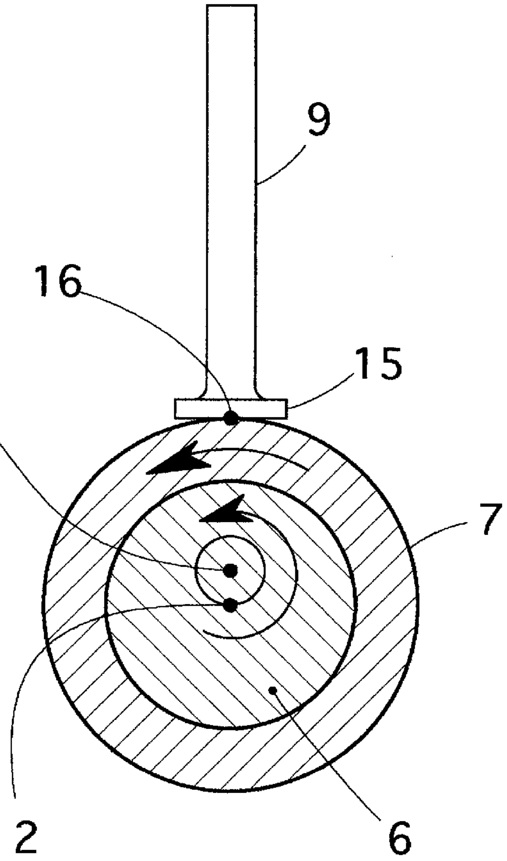
FIG. 4 is a cross-sectional view of an eccentric drive in the bottom dead center position of the plunger.

FIGS. 3 and 4 illustrate a mode of operation of the eccentric drive and the movement on the rolling ring 7 when passing through the top and bottom dead center positions. FIG. 3 shows the plunger 9 in the top dead center position. During advancing rotation of the eccentric pin 6 or of the drive shaft 3 in the counterclockwise direction, the contact area 16 moves to the left as shown in FIG. 3. This results in the rolling ring 7 rotating in the clockwise direction due to the fact that the pre-loading of the spring 17 and the pressure in the delivery space are greatest in the region of the top dead center position, so that the force exerted by the spring 17 is greater than the sliding friction force between the disk-shaped widened portion 15 and the rolling ring 7.

FIG. 4 shown the bottom dead center position of the plunger 9. If the eccentric pin 6 moves in the direction of the bottom dead center position, the contact area 16 moves to the right in FIG. 4. As a result of this, the rolling ring 7 performs a rotational movement in the counterclockwise direction. As above, this is due to the fact that the force exerted by the spring 17 is greater than the sliding friction force between the disk-shaped widened portion 15 and the rolling ring 7 in the region of the bottom dead center position.

The rolling ring 7 therefore moves back and forth relative to the disk-shaped widened portion 15 during the rotary movement of the eccentric pin 6. The rolling ring 7 changes its direction of rotation twice during each revolution of the drive shaft 3. This leads to problems at high rotational speeds of the drive shaft 3, because the rate of change of the direction of rotation of the rolling ring 7 increases and thus, the acceleration moment of the rolling ring 7 also increases. In the worst case scenario, sliding takes place between the disk-shaped widened portion 15 and the rolling ring 7 during rotary acceleration peaks, which may result in damage to the contact area 16.

Figure 5:
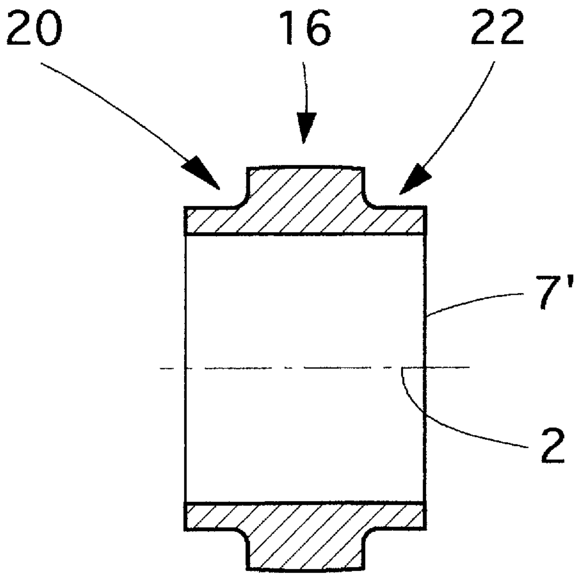
FIG. 5 is a cross-sectional view of a rolling ring according to the present invention.

Damage at high rotational speeds in the region of the contact area 16 may be avoided by provided a rolling ring 7' as shown in FIG. 5. The rolling ring 7' essentially corresponds to the rolling ring 7 of FIGS. 1–4, but the rolling ring 7' has two recesses or relieved portions 20, 22 provided at the outer circumference thereof. The relieved portions 20, 22 are located axially outside the region of the contact area 16. Each relieved portion 20, 22 is provided at the outer margin of the rolling ring 7'. A contact area 16' (i.e., the projecting part of the outer circumference of the rolling ring 7') is located between the relieved portions 20, 22 and is slightly cambered. The relieved portions 20, 22 of the rolling ring 7' are roughly rectangular as viewed in cross-section in FIG. 5.

A first embodiment of the rolling ring according to the present invention has a lower moment of inertia and a correspondingly lower acceleration moment. The lower acceleration moment permits a greater rate of change of the direction of rotation of the rolling ring and a higher rotational speed of the drive shaft. This results in a higher delivery output of the high-pressure pump, without a second embodiment of a rolling ring sliding on the disk-shaped widened portion of the plunger during rotary-acceleration peaks. A high-pressure delivery pump having an eccentric drive according to the present invention can therefore be operated at higher rotational speeds, without damage or excessive wear occurring on the components of the eccentric drive.

What is claimed as new and desired to be secured by Letters Patent of the United States is:

1. A high-pressure delivery pump comprising:

a high-pressure cylinder;

a plunger displaceable in said high-pressure cylinder, wherein said plunger has a widened portion extending radially outwardly of said high pressure cylinder;

an eccentric pin arranged on a drive shaft, wherein an outer circumference of said eccentric pin faces said widened portion of said plunger extending from said high-pressure cylinder;

a rolling ring rotatably mounted on said eccentric pin, wherein said rolling ring has at least one relieved portion; and a contact area created between said widened portion of said plunger and said outer circumference of said rolling ring, when said widened portion of said plunger bears against said outer circumference of said rolling ring.

2. The high-pressure delivery pump as claimed in claim 1, wherein said at least one relieved portion of said rolling ring is formed at said outer circumference of said rolling ring.

3. The high-pressure delivery pump as claimed in claim 1, wherein said at least one relieved portion of said rolling ring is formed at said outer circumference of said rolling ring so as to be axially outside a region of said contact area.

4. The high-pressure delivery pump as claimed in claim 1, wherein said at least one relieved portion includes first and second relieved portions laterally defining said contact area, said first and second relieved portions each being provided at said outer circumference of said rolling ring.

5. The high-pressure delivery pump as claimed in claim 1, wherein said at least one relieved portion of said rolling ring is roughly rectangular in shape in cross-section.

6. The high-pressure delivery pump as claimed in claim 1, wherein said outer circumference of said rolling ring is cambered.

7. A rolling ring for a high-pressure delivery pump including a high-pressure cylinder, a plunger displaceable in the high-pressure cylinder and having a widened portion extending radially outwardly of the high pressure cylinder, an eccentric pin arranged on a drive shaft and having an outer circumference facing the widened portion of the plunger, and a contact area created between the widened portion of the plunger and an outer circumference of said rolling ring, said rolling ring comprising:

at least one relieved portion, wherein said rolling ring is rotatably mounted on the eccentric pin arranged on the drive shaft of the high-pressure delivery pump.

8. The rolling ring as claimed in claim 7, wherein said at least one relieved portion is formed at said outer circumference of said rolling ring.

9. The rolling ring as claimed in claim 7, wherein said at least one relieved portion includes first and second relieved portions laterally defining the contact area, said first and second relieved portions each being provided at said outer circumference of said rolling ring.

10. The rolling ring as claimed in claim 7, wherein said at least one relieved portion is roughly rectangular in shape in cross-section.

11. The rolling ring as claimed in claim 7, wherein said outer circumference of said rolling ring is cambered.

* * * * *